Feb. 25, 1941.  W. A. RAY  2,232,970
PILOT VALVE STRUCTURE
Filed Feb. 13, 1939   2 Sheets-Sheet 1

WILLIAM A. RAY,
INVENTOR.
BY John H. Rouse.
ATTORNEY

Feb. 25, 1941. W. A. RAY 2,232,970
PILOT VALVE STRUCTURE
Filed Feb. 13, 1939 2 Sheets-Sheet 2
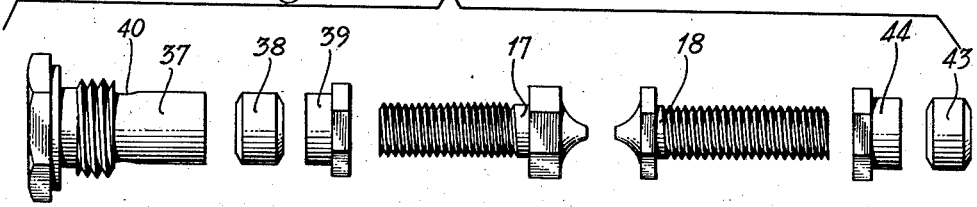
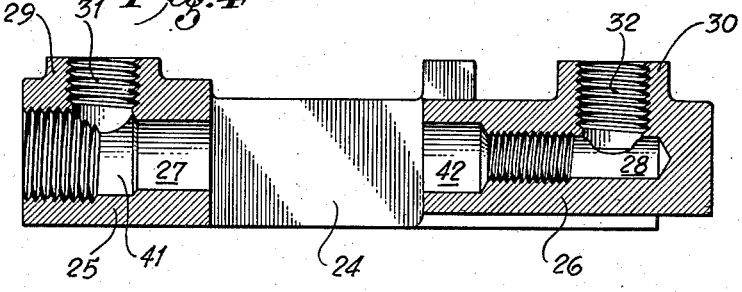
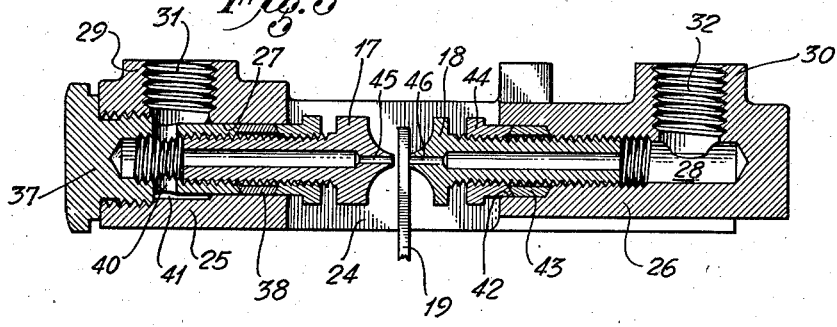
WILLIAM A. RAY,
INVENTOR.
BY John H. Rouse
ATTORNEY Patented Feb. 25, 1941

2,232,970

UNITED STATES PATENT OFFICE 2,232,970

PILOT VALVE STRUCTURE

William A. Ray, Glendale, Calif.

Application February 13, 1939, Serial No. 256,123

4 Claims. (Cl. 251—156)

My present invention relates to fluid control valves and in particular to a pilot valve structure for fluid pressure operated valves.

It is a chief object of my invention to provide a valve structure in which the parts are rigidly maintained in assembled relation.

Another object is the provision of a pilot valve structure providing a pair of opposed valve port members and rigid mountings for the same which are readily machinable.

Another object is the provision of a pilot valve structure having a pair of opposed valve port members and mountings therefor, and in which one of the valve port members is carried by a cap member secured in the mounting whereby machining of the opposed mounting is facilitated.

Other objects and advantages of my invention will be found in the description, the drawings and the appended claims.

For complete understanding of the invention, reference may be had to the following detailed description and accompanying drawings, in which:

Figure 3 is an enlarged sectional view of the pilot valve structure shown in Fig. 1 and taken along the line 3—3 of Fig. 2;

Figure 4 is a sectional view of the valve body shown in Fig. 3; and

Figure 5 is an exploded view in elevation of the valve port members and associated parts of the valve structure shown in Fig. 3.

Figure 1:
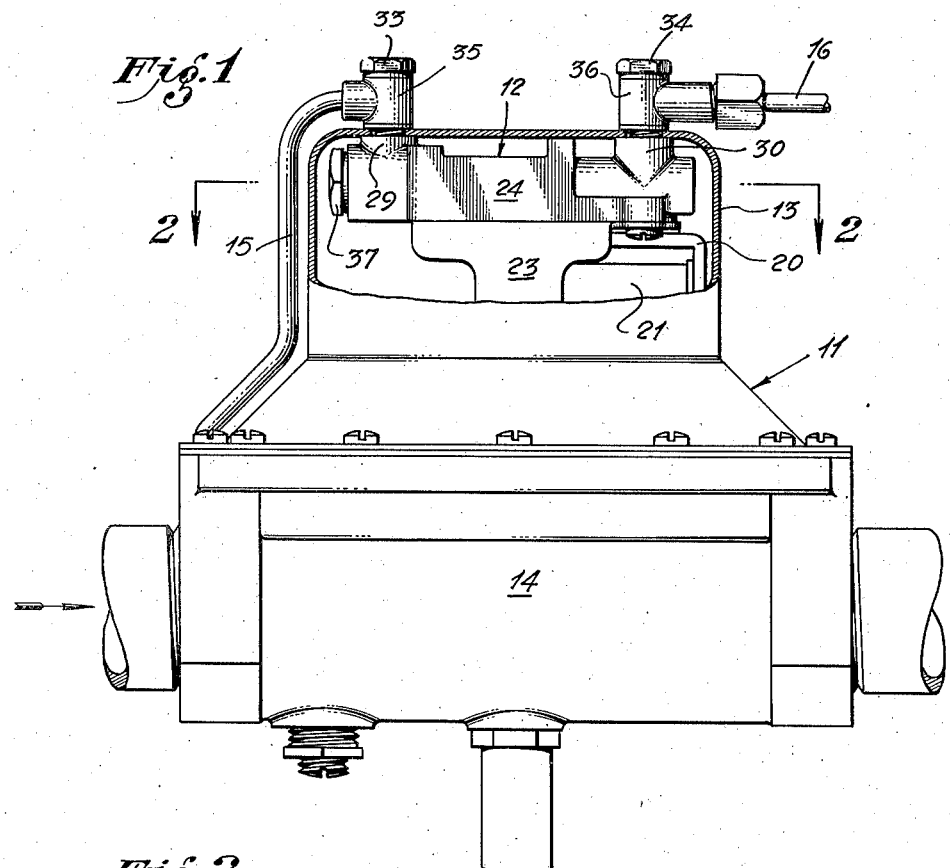
Figure 1 is a side elevation, partly broken away, of a fluid pressure operated valve comprising the pilot valve structure of my invention.
Figure 2:
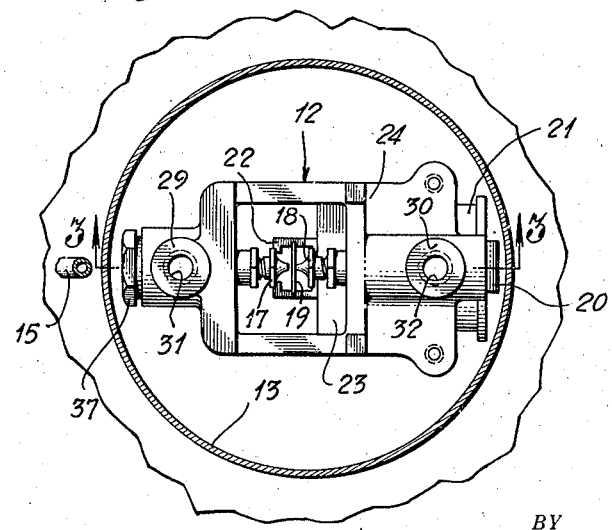
Figure 2 is a section taken along the line 2—2 of Fig. 1.

In the drawings, the numeral 11 generally indicates a fluid pressure operated main valve and the numeral 12 a pilot valve for controlling fluid pressure applied to the diaphragm compartments of the main valve and mounted in the upper wall of a housing 13 which defines a pressure compartment above a diaphragm member (not shown) which is disposed covering an opening in the top wall of the main valve body 14.

The pilot valve structure 12 is connected by a pipe 15 with the inlet side of the main valve and below the diaphragm, and a pipe 16 leads from the structure for venting fluid from within the housing in the opening operation of the main valve. Pipe 15 is connected by passageways in the structure, which will be hereinafter fully described, with a jet or port member 17, and vent pipe 16 with an opposed port member 18. The end portion of a flat electromagnetically operated armature 19 is alternately movable into and out of contact with the extended ends of the members 17 and 18 to control fluid flow therethrough, whereby the pressure above and below the main valve diaphragm is varied to open and close the main valve in a manner well known in the art.

An electromagnetic device for operating the armature 19 comprises a U-shaped core 20 and an energizing coil 21. A guide for the armature is shown at 22 and the numeral 23 indicates a stop member which limits the upward movement of the main valve diaphragm.

A pilot valve body 24, which may preferably be a metal casting, provides integral spaced portions 25 and 26 projecting from one side thereof and having axially aligned passageways 27 and 28 formed therein.

Bosses 29 and 30, having threaded openings 31 and 32 therein adapted to receive hollow screw members 33 and 34 extending through collars 35 and 36, provide means for supporting the pilot valve structure in the wall of the housing 13.

Openings are made in the side walls of the hollow screw members 33 and 34 whereby fluid communication is established through them and the collars 35 and 36 between the pipes 15 and 16 and the openings 31 and 32, respectively.

The outer end portion of passageway 27 is threaded to receive a hollow cap member 37 which is internally threaded to receive the inner end portion of the port member 17. It will be noted that thus the member 17 is not carried by the body portion 25 directly but through the medium of the cap member 37.

A "metallic" packing member 38, compressed between the inner end of member 37 and a packing nut 39, serves to prevent leakage of fluid between the periphery of member 17 and the wall of passageway 27. This arrangement also serves as means for locking the member 17 in position after longitudinal adjustment thereof.

A lateral opening 40 in the side wall of member 37 permits communication between the opening 31 and the interior of port member 17. The medial portion 41 of passageway 27 is enlarged to provide clearance around the member 37 so that, in assembly, the opening 40 need not be aligned with opening 31.

Threadedly secured in the body portion 26 is the port member 18, disposed in opposed relation to port member 17. Passageway 28 is enlarged at its inner end 42 to receive a packing member 43 which is compressed by a packing nut 44, carried by member 18, to prevent leakage of fluid between the periphery of member 18 and the wall of passageway 42, and also to lock the member 18 in position after final longitudinal adjustment thereof.

It is to be understood that the term "inner" and "outer," as applied in this specification to the passageways 27 and 28, are intended to define respectively the adjacent and remote ends of said passageways.

The extended end portions of the port members 17 and 18 are provided with restricted passageways 45 and 46 respectively which may be as small in diameter as 0.020 inch. The area of the end portions of these members with which the armature 19 cooperates is made as small as is practical so that high contact pressure thereon, with resultant absence of leakage, may be effected with minimum expenditure of power in the electromagnetic device.

An obvious advantage of the pilot valve structure of my invention resides in the ease of machining the body portions from one end to receive parts of uniform size in each of the projecting portions. The bores 27 and 42 may be of the same diameter so that the packing members 38 and 43 may be alike. Also, the port members 17 and 18 may be machined from the same stock and the nuts 39 and 44 may be identical. All this is made possible by arranging the cap member 37 to indirectly support the port member 17 in the body portion.

The general structure of the valve shown in Fig. 1 is claimed in my copending application, Serial No. 222,673, filed August 2, 1938.

It is obvious that modifications may be made in the structure which I have shown and described without departing from the spirit of my invention. I intend, therefore, that my invention be limited only by the scope of the appended claims.

I claim as my invention:

1. A fluid control valve structure comprising a body having a cylindrical passageway therethrough; a hollow cylindrical cap member tightly threaded in one end of said passageway, the outer end of said cap member being closed; a cylindrical valve port member, having a concentric passage therethrough, adjustably threaded in the open inner end of said cap member and extending through the other end of said passageway; said cap member having an opening through its side wall within said passageway, and said body having an opening connecting said passageway with the exterior of said body; and means cooperable with the extended end of said valve port member for controlling fluid flow therethrough.

2. A fluid control valve structure comprising a body having a cylindrical passageway therethrough; a hollow cylindrical cap member tightly threaded in one end of said passageway, the outer end of said cap member being closed; a cylindrical valve port member, having a concentric passage therethrough, adjustably threaded in the open inner end of said cap member and extending through the other end of said passageway; packing means in said passageway and encircling said valve port member; means threaded on said valve port member for compressing said packing means against the inner end of said cap member and the wall of said passageway; said cap member having an opening through its side wall within said passageway, and said body having an opening connecting said passageway with the exterior of said body; and means cooperable with the extended end of said valve port member for controlling fluid flow therethrough.

3. A fluid control valve structure comprising a pair of spaced brackets; one of said brackets having a first cylindrical passageway extending therethrough; the other of said brackets having a second cylindrical passageway therein, axially aligned with said first passageway, extending through the side of the bracket adjacent said one of said brackets; a hollow cylindrical cap member tightly threaded in the outer end of said first passageway, the outer end of said cap member being closed; a first cylindrical valve port member, having a concentric passage therethrough, adjustably threaded in the open end of said cap member so that its protruding end is adjacent the other of said brackets; a second cylindrical valve port member, having a concentric passage therethrough, adjustably threaded in the open end of said second passageway so that its protruding end is adjacent said first valve port member; said cap member having an opening through its side wall within said passageway, and said structure having an opening connecting said first passageway with the exterior of the structure; said structure having another opening connecting said second passageway with the exterior of the structure; and means cooperable with said protruding ends of said valve port members for controlling fluid flow therethrough; said protruding ends of said valve port members being accessible from the exterior of said structure.

4. A fluid control valve structure comprising a rigid body having a pair of adjacent spaced portions integral with and projecting from one side thereof, one of said portions having a first cylindrical passageway extending therethrough, the other of said portions having a second cylindrical passageway therein axially aligned with said first passageway and extending through the side of the portion adjacent to the one of said portions, a hollow member threadedly received in said first passageway and closing the outer end thereof, a first valve port member having a passage therethrough and threadedly received in said hollow member and extending through the inner end of said first passageway, packing means in said first passageway and surrounding said first valve port member, means threadedly carried by said first valve port member and adapted to compress said packing means between the wall of said first passageway and the periphery of said first valve port member, a second valve port member having a passage therethrough and threadedly received in said second passageway and extending through the inner end thereof, said first and said second passageway each having an opening branching out therefrom and extending to the exterior of said body, said hollow member having an opening in the side wall thereof communicating with said first passageway, and means cooperable with the extended ends of said first and said second valve port members for controlling fluid flow therethrough.

WILLIAM A. RAY.